United States Patent
Conrad

(10) Patent No.: US 8,312,128 B2
(45) Date of Patent: Nov. 13, 2012

(54) IDENTIFICATION OF MANAGEMENT INFORMATION BASE OBJECT IDENTIFIERS SUPPORTED BY A MANAGED DEVICE

(75) Inventor: Jeff Conrad, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 159 days.

(21) Appl. No.: 12/847,812

(22) Filed: Jul. 30, 2010

(65) Prior Publication Data

US 2012/0030327 A1 Feb. 2, 2012

(51) Int. Cl.
 *G06F 15/173* (2006.01)
(52) U.S. Cl. ........................................ 709/223
(58) Field of Classification Search .................. None
 See application file for complete search history.

(56) References Cited

U.S. PATENT DOCUMENTS

| | | | |
|---|---|---|---|
| 6,219,703 B1 * | 4/2001 | Nguyen et al. | 709/224 |
| 6,675,209 B1 | 1/2004 | Britt | |
| 6,728,768 B1 | 4/2004 | Carney | |
| 2002/0161935 A1 | 10/2002 | Blaisdell | |
| 2006/0092861 A1 | 5/2006 | Corday et al. | |
| 2006/0242284 A1 | 10/2006 | Savage | |
| 2008/0040467 A1 | 2/2008 | Mendiratta et al. | |
| 2009/0132719 A1 * | 5/2009 | Havard | 709/230 |

OTHER PUBLICATIONS

An Efficient Transmission for Large MIB Tables in Polling-Based SNMP. Park et al. IEEE. 2003.

* cited by examiner

*Primary Examiner* — Scott Christensen
(74) *Attorney, Agent, or Firm* — Scott A. Pojunas

(57) ABSTRACT

Example embodiments relate to identification of management information base (MIB) object identifiers (OIDs) supported by a managed device. In example embodiments, a group of MIB OIDs to be tested for support by a managed device is identified. A series of requests including a MIB OID may then be transmitted to the managed device. Finally, MIB OIDs from the group of MIB OIDs to be tested for support that are supported by the managed device may be identified based on responses to the requests received from the managed device.

14 Claims, 5 Drawing Sheets

IDENTIFICATION OF MANAGEMENT INFORMATION BASE OBJECT IDENTIFIERS SUPPORTED BY A MANAGED DEVICE

BACKGROUND

In monitoring the conditions of a network, a Network Management System (NMS) may use the Simple Network Management Protocol (SNMP) to communicate with a number of network devices, also known as managed devices. In particular, the NMS may use SNMP to transmit a request for information or a command to an SNMP agent running on a managed device. The SNMP agent on the managed device may, in turn, access the information referenced in the request or command from one or more local Management Information Bases (MIBs), each of which may be a collection of object identifiers (OIDs) mapped to corresponding values. In this manner, the NMS may remotely monitor and control the operation of each managed device in the network.

BRIEF DESCRIPTION OF THE DRAWINGS

The following detailed description references the drawings, wherein.

DETAILED DESCRIPTION

As detailed above, SNMP provides a mechanism for an NMS to remotely poll or control a managed device. To take advantage of SNMP functionality in a managed device, however, the NMS must generally be aware of the object identifiers included in the managed device's MIBs, which may vary depending on the particular network module cards included in the managed device. While an NMS may include a number of loaded MIBs, not all of these MIBs are supported by every managed device. Conversely, a managed device may support a particular MIB, but the NMS will be unable to access the corresponding object identifiers if the MIB is not also loaded on the NMS.

Accordingly, a network operator may wish to transmit a series of queries to a device to identify which MIBs are supported by both the NMS and the managed device. The network operator may also desire to identify MIBs supported by the managed device that are not currently loaded in the NMS, so that these MIBs can be obtained and loaded in the NMS. Because a typical managed device may include multiple MIBs with thousands of object identifiers, a MIB discovery process that accesses every object identifier contained in the MIB of a managed device can be time consuming and taxing on the network infrastructure.

To address this issue, example embodiments disclosed herein relate to efficient processes for discovering important MIB object identifiers supported by a particular managed device. In some embodiments, an NMS may identify a subset of MIB OIDs from the MIBs loaded on the NMS. The NMS may then transmit a series of requests to a managed device. The MIB OID included in each request may be selected based on a response to a previous request and at least a portion of the requests may include a MIB OID from the subset of MIB OIDs of interest. The NMS may then identify, based on responses to the requests, a group of MIB OIDs in the subset of MIB OIDs that are supported by the managed device.

In this manner, the NMS may efficiently discover a set of MIBs that are supported by the managed device, while reducing the amount of traffic generated in the network. In addition, in some embodiments, the NMS may also identify MIBs that are supported by the managed device, but not loaded in the NMS, thereby allowing an operator to easily identify MIBs that should be loaded in the NMS. Additional embodiments and applications of such embodiments will be apparent to those of skill in the art upon reading and understanding the following description.

Figure 1:
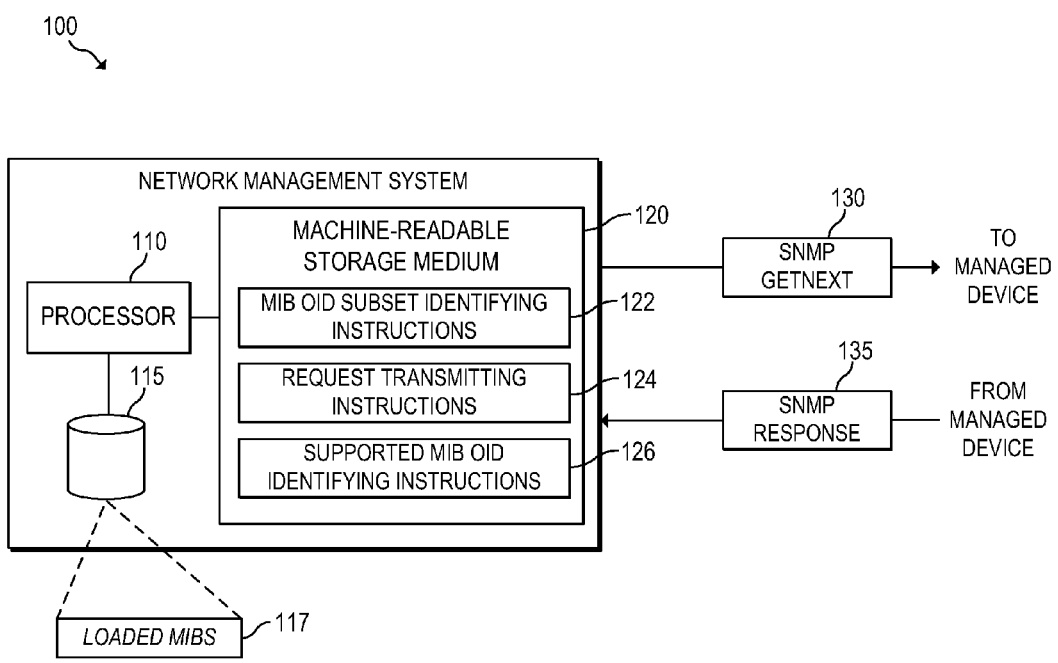
FIG. 1 is a block diagram of an example network management system for identifying MIB object identifiers supported by a managed device.

Referring now to the drawings, FIG. 1 is a block diagram of an example network management system 100 for identifying MIB object identifiers supported by a managed device. Network management system 100 may be any device capable of transmitting requests and receiving corresponding responses from a managed device, which, in some instances, may generated in accordance with the Simple Network Management Protocol (SNMP). Thus, network management system 100 may be, for example, a workstation, a desktop computer, a notebook computer, or any other computing device for exchanging messages with a managed device. In the embodiment of FIG. 1, network management system 100 includes processor 110, storage device 115, and machine-readable storage medium 120.

Processor 110 may be one or more central processing units (CPUs), semiconductor-based microprocessors, and/or other hardware devices suitable for retrieval and execution of instructions stored in machine-readable storage medium 120. In particular, processor 110 may fetch, decode, and execute instructions 122, 124, 126 to implement the functionality described in detail below. As an alternative or in addition to fetching, decoding, and executing instructions, processor 110 may include one or more integrated circuits (ICs) or other electronic circuits that comprise a plurality of electronic components for performing the functionality of one or more of instructions 122, 124, 126 described below.

Storage device 115 may comprise a number of physical media for storing data, such as one or more hard disks, solid state drives, tape drives, nanodrives, holographic storage devices, or any combination of such storage devices. In some embodiments, storage device 115 may include a plurality of storage devices that, in combination, form a pool of available storage.

As illustrated, storage device 115 may maintain a database of loaded Management Information Bases (MIBs) 117 and information regarding the object identifiers included in each of these MIBs. For example, for each MIB loaded in NMS 100, storage device 115 may store a hierarchy including a number of nodes, each described by a given object identifier. Each leaf node (i.e., a node in the hierarchy with no children) may relate to a particular managed object. Each instance of a managed object may in turn be a property of a corresponding managed device for which the managed device stores a value.

NMS 100 may use the object identifiers described in the set of loaded MIBs 117 to formulate queries and commands to access and/or modify particular managed objects on each network device managed by NMS 100. Each managed device may be any hardware device that is capable of communicating with NMS 100 using the SNMP protocol or a similar protocol. Thus, each managed device may be, for example, a network node (e.g., a router or switch), a printer or scanner, a consumer electronics device, and the like.

Machine-readable storage medium 120 may be any electronic, magnetic, optical, or other physical storage device that contains or stores executable instructions. Thus, machine-readable storage medium may be, for example, Random Access Memory (RAM), an Electrically Erasable Programmable Read-Only Memory (EEPROM), a hard disk, a Compact Disc Read Only Memory (CD-ROM), and the like. As described in detail below, machine-readable storage medium 120 may include instructions for generating and transmitting a series of requests to a managed device to identify MIB OIDs supported by the managed device.

More specifically, machine-readable storage medium 120 may include MIB OID subset identifying instructions 122, which may identify a subset of MIB object identifiers of interest from the loaded MIBs 117. In some embodiments, identifying instructions 122 may identify, from each MIB maintained in loaded MIBs 117, each MIB root OID and/or one or more MIB table OIDs. For example, suppose one of the MIBs included in loaded MIBs 117 is the Asynchronous Transfer Mode (ATM) MIB, ATM-MIB. In this case, identifying instructions 122 may identify the MIB root OID of ATM-MIB as 1.3.6.1.2.1.37 (iso.org.dod.internet.mgmt.mib-2.atmMIB) and add this OID to the subset of MIB OIDs of interest. ATM-MIB also includes a number of tables, each of which may store multiple related object instances accessible via a single OID. Thus, identifying instructions 122 may identify the OID of one or more tables in ATM-MIB, such as 1.3.6.1.2.1.37.1.2 (iso.org.dod.internet.mgmt.mib-2.atmMIB.atmInterfaceConfTable). Accordingly, identifying instructions 122 may also add the OIDs for the identified tables to the subset of MIB OIDs of interest.

It should be noted that, in some embodiments, identifying instructions 122 may apply a different procedure in identifying the subset of MIB OIDs of interest. As one example, an operator of NMS 100 may specify the MIB OIDs of interest to be tested for support by a particular managed object. Other suitable implementations of identifying instructions 122 will be apparent to those of skill in the art.

After identifying a subset of MIB OIDs to be tested for support by a managed device, request transmitting instructions 124 may formulate a series of requests and transmit these requests to the managed device. In generating the requests, transmitting instructions 124 may select a MIB OID to be included in each request based on a previous response from the managed device. Furthermore, as described below, at least a portion of the requests transmitted to the managed device may include a MIB OID from the subset of MIB OIDs of interest identified by instructions 122.

In some embodiments, each of the requests transmitted to the managed device may be a Simple Network Management Protocol (SNMP) GetNext request 130. A GetNext request may allow NMS 100 to transmit a particular OID and, in response, receive a lexicographically next OID from the MIBs supported by the managed device. In generating the SNMP GetNext request 130, request transmitting instructions 124 may first generate a GetNextRequest-PDU, which may include a particular MIB OID. Request transmitting instructions 124 may then encapsulate the GetNextRequest-PDU in an SNMP message, adding an SNMP version and an SNMP community string to the message. Finally, request transmitting instructions 124 may encapsulate the SNMP message into appropriate transport, network, data link, and physical layers for transmission to the managed device.

To give an example implementation of instructions 124 using SNMP GetNext requests, request transmitting instructions 124 may initially transmit a GetNext request 130 including the MIB root (0.0). Upon receipt of this request, the managed device may return an SNMP response 135 identifying the lexicographically first MIB OID supported by the managed device. Transmitting instructions 124 may then identify the returned MIB OID included in the response 135 and determine whether there are remaining MIB OIDs in the subset of MIB OIDs of interest that are lexicographically subsequent to the returned MIB OID.

As used herein, the term "lexicographically subsequent" may refer to a MIB OID that is in a location in the hierarchy that is reached after another MIB OID when performing a depth-first traversal of the hierarchy. In mathematical terms, suppose the returned OID, A, has p elements, while a particular OID in the subset of OIDs of interest, B, has q elements. Based on these definitions, B is lexicographically subsequent to A if either: (1) p<q and, for all i, where i<=p, A(i)=B(i); or (2) there exists an i such that i<=p, i<=q, A(i)<B(i), and, for all j<i, A(j)=B(j).

When it is determined that there is at least one remaining MIB OID in the subset of interest that is lexicographically subsequent to the returned MIB OID, transmitting instructions 124 may generate and transmit an additional GetNext request 130 including the lexicographically next MIB OID from the subset of MIB OIDs of interest. Transmitting instructions 124 may continue this procedure until, for example, exhausting the subset of MIBs of interest or receiving a response from the managed device indicating that there are no remaining MIB OIDs.

Supported MIB OID identifying instructions 126 may identify, based on each response from the managed device, a group of zero or more MIB OIDs from the subset of MIB OIDs of interest that are supported by the managed device. For example, identifying instructions 126 may identify the MIB OID included in each response from the managed device and, in response, determine whether at least one MIB OID of interest is a prefix of the returned MIB OID. As a specific example, suppose that the returned MIB OID is 1.3.6.1.2.1.4.2 and the subset of MIBs of interest includes 1.3.6.1.2 and 1.3.6.1.2.1.4. In this case, the longest matching prefix is 1.3.6.1.2.1.4.

If at least one MIB OID of interest is a prefix of the returned MIB OID, identifying instructions 126 may add the longest prefix, which may be an exact match in some cases, to a group of loaded MIB OIDs that are supported by the managed device. On the other hand, when none of the MIB OIDs of interest is a prefix of the returned MIB OID, identifying instructions 126 may add the returned MIB OID to a group of MIB OIDs that are supported by the managed device, but not loaded in NMS 100. In this manner, identifying instructions 126 may compile a list MIBs included in loaded MIBs 117 that are supported by the managed device and a list of MIBs supported by the managed device that are not included in loaded MIBs 117. NMS 100 may subsequently display the OIDs included in each of these lists to an operator via a user interface of NMS 100.

Figure 2:
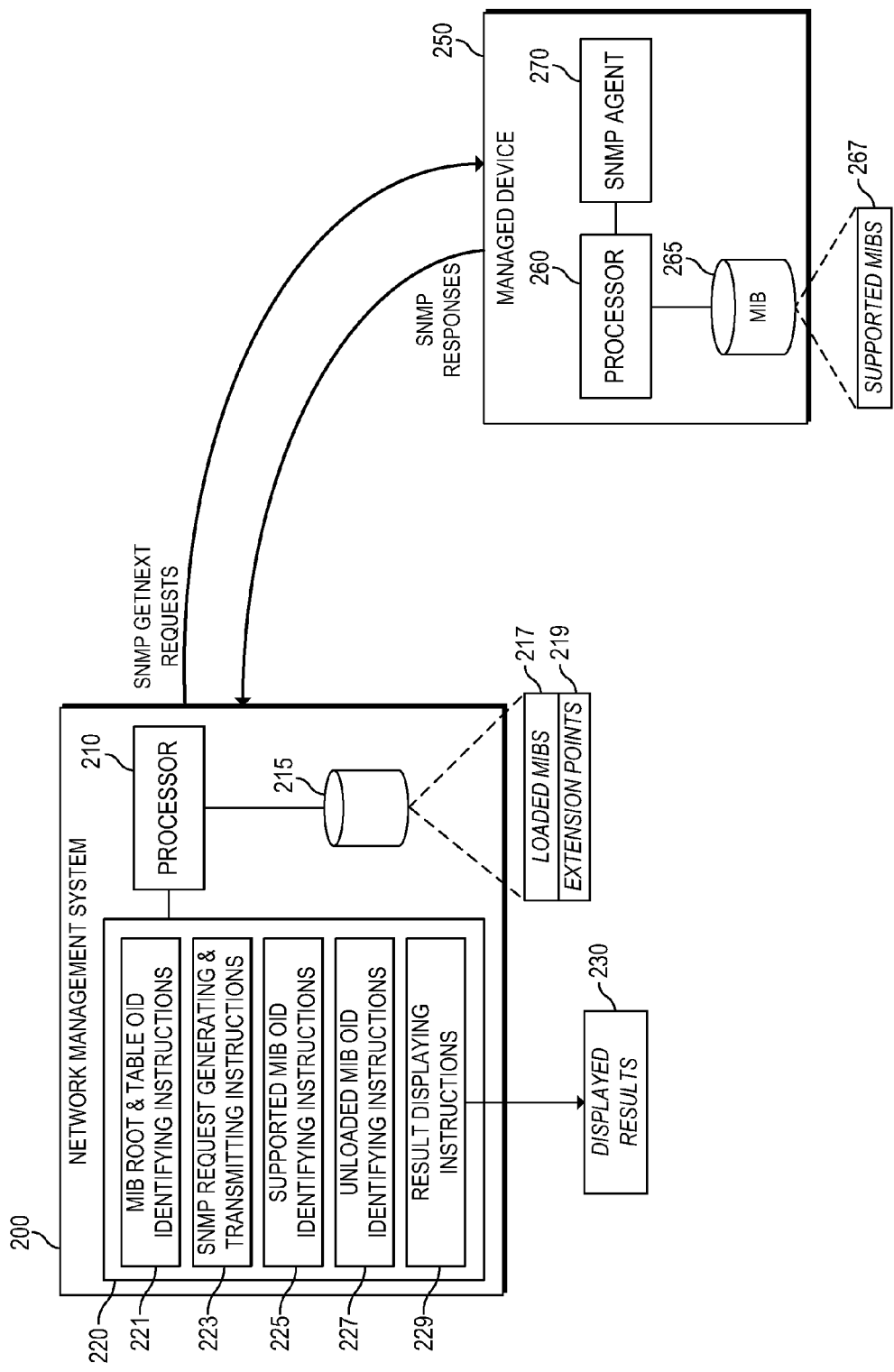
FIG. 2 is a block diagram of an example network management system in communication with a managed device for identifying MIB object identifiers supported by the managed device.

FIG. 2 is a block diagram of an example network management system 200 in communication with a managed device 250 for identifying MIB object identifiers supported by the managed device 250. As illustrated, network management system 200 may send a series of SNMP GetNext requests to managed device 250 and, in response, receive a series of corresponding SNMP responses.

Network management system 200 may be, for example, a workstation, a desktop computer, a notebook computer, or any other computing device for exchanging SNMP messages with managed device 250. In the embodiment of FIG. 2, network management system 200 includes processor 210, storage device 215, and machine-readable storage medium 220. As with processor 110 of FIG. 1, processor 210 may be one or more hardware devices suitable for retrieval and execution of instructions stored in machine-readable storage medium 220 and/or a plurality of electronic components for performing the functionality of one or more of instructions 221, 223, 225, 227, 229.

As with storage device 115 of FIG. 1, storage device 215 may comprise a number of physical media for storing data and may include a plurality of storage devices that, in combination, form a pool of available storage. As illustrated, storage device 215 may include loaded MIBs 217 that describe a number of managed objects supported by one or more managed devices, such as managed device 250.

Storage device 215 may also include a list of extension points 219, which may identify one or more MIB OIDs that are commonly extended in the MIB hierarchy. It may therefore be desirable to identify direct children of these extension points 219 when running the MIB discovery process. Accordingly, as described below, instructions 223 may be configured to consider extension points 219 when generating and transmitting SNMP GetNext requests. To name two examples, iso.org.dod.internet.mgmt.MIB-2 (1.3.6.1.2.1) and iso.org.dod.internet.private. enterprises (1.3.6.1.4.1) are commonly extended OIDs that may be included in the list of extension points 219. It should be apparent, however, that any MIB OIDs of particular interest as extension points may be included in the list of extension points 219.

Machine-readable storage medium 220 may be any electronic, magnetic, optical, or other physical storage device that contains or stores executable instructions. In the embodiment of FIG. 2, machine-readable storage medium 220 may include MIB root and table OID identifying instructions 221, which may identify a group of MIB object identifiers to be tested for support by managed device 250. Identifying instructions 221 may identify, for example, each root MIB OID in loaded MIBs 217 and one or more OIDs of tables in the loaded MIBs.

SNMP request generating and transmitting instructions 223 may generate and transmit a series of SNMP GetNext requests to managed device 250, at least a portion of which may include a MIB OID from the subset of MIB OIDs to be tested for support. For example, request generating and transmitting instructions 223 may initially transmit a GetNext request including the MIB root (0.0) to managed device 250. Upon receipt of this request, SNMP agent 270 of managed device 250 may process the request, access supported MIBs 267 in storage device 265, and return a lexicographically first MIB OID in an SNMP response.

Generating and transmitting instructions 223 may then identify the returned MIB OID included in the previous response and determine whether the returned MIB OID includes a prefix that is one of the predetermined extension points 219. If so, instructions 223 may determine the OID of a lexicographically next child of the identified extension point 219 and generate an SNMP GetNext including this OID. To give a specific example, suppose that extension points 219 include 1.3.6.1.2.1 and 1.3.6.1.4.1 and that managed device 250 returns 1.3.6.1.2.1.5.1.2. In this case, instructions 223 may determine that the returned MIB OID includes a prefix that is an extension point (namely, 1.3.6.1.2.1) and that the direct child branch of this extension point included in the returned MIB is 1.3.6.1.2.1.5. Accordingly, instructions 223 may truncate the returned MIB OID down to the direct child branch of the extension point and add one to the child branch's value. Instructions 223 would therefore generate an SNMP GetNext request including 1.3.6.1.2.1.6 and send this request to managed device 250.

If, on the other hand, instructions 223 determine that the returned MIB OID is not a child of a predetermined extension point 219, instructions 223 may follow the same procedure as instructions 124 of FIG. 1. Thus, instructions 223 may determine whether there are remaining MIB OIDs in the group to be tested for support that are lexicographically subsequent to the returned MIB OID. If so, instructions 223 may generate and transmit a request including the MIB OID from the group that is lexicographically subsequent to the returned MIB OID. Instructions 223 may repeat this procedure for each returned MIB OID until exhausting the list of MIB OIDs to be tested or, alternatively, receiving a message indicating that managed device 250 has reached the end of its supported MIBs 267.

Supported MIB OID identifying instructions 225 may identify, based on the SNMP responses from managed device 250, a group of zero or more MIB OIDs from the group of MIB OIDs to be tested that are supported by managed device 250. For example, upon receipt of an SNMP response from managed device 250, identifying instructions 225 may determine whether the MIB OID included in the response includes at least one prefix in the group of MIBs to be tested. If so, identifying instructions 225 may identify the longest prefix, which may in some cases be an exact match, and add this prefix to the group of MIB OIDs that are supported by managed device 250 and loaded in NMS 200.

Unloaded MIB OID identifying instructions 227 may identify, based on the SNMP responses from managed device 250, a group of zero or more MIB OIDs that are supported by managed device 250, but not loaded in NMS 200. When identifying instructions 227 determine that the MIB OID included in an SNMP response from managed device 250 does not include a prefix in the group of MIBs to be tested, instructions 227 may add the returned MIB OID to a list of MIB OIDs that are supported, but not loaded in NMS 200.

Result displaying instructions 229 may compile the MIB OIDs identified by instructions 225, 227, and output a list 230 of supported MIBs and a list of unloaded MIBs to a user of NMS 200. Displaying instructions 229 may present this list 230 as, for example, an HTML document, a text file, a word processing document, or a Portable Document Format (PDF) file. In some embodiments, displaying instructions 229 may include a selectable interface element, such as a link or a button, that initiates a process for loading MIBs into NMS 200. In this manner, a user of NMS 200 may view the list of unloaded MIBs and, in response, select the element to load those MIBs into the system. An example of the output 520 generated by result displaying instructions 229 is described in further detail below in connection with FIG. 5.

Managed device 250 may be any hardware device that is capable of communicating with NMS 200 using the SNMP protocol or a similar protocol. Thus, each managed device may be, for example, a router, a switch, a bridge, a hub, a printer or scanner, a consumer electronics device, and the like. In the embodiment of FIG. 2, managed device 250 includes processor 260, storage device 265, and SNMP agent 270.

Processor 260 may be one or more hardware devices suitable for retrieval and execution of instructions for an SNMP agent 270 and/or a plurality of electronic components for performing the functionality of SNMP agent 270. Storage device 265 may comprise a number of physical media for storing data and may include a plurality of storage devices that, in combination, form a pool of available storage.

Supported MIBs 267 may be a database of MIBs loaded in managed device 250. Thus, supported MIBs 276 may be a hierarchical structure containing a number of nodes, each described by a particular object identifier. Each leaf node may relate to a particular managed object, which may maintain a particular piece of information regarding managed device 250 and its interfaces, such as status or statistical information. As detailed above, NMS 200 may access the information maintained in supported MIBs 267 through the use of SNMP queries by providing the object identifier(s) of the particular managed objects NMS 200 desires to access.

SNMP agent 270 may include a plurality of executable instructions for implementing SNMP functionality on managed device 250. SNMP agent 270 may be implemented as a separate process running in managed device 250 or, alternatively, be incorporated into the operating system of managed device 250. SNMP agent 270 may be responsible for receiving SNMP requests from NMS 200, parsing the requests, accessing one or more managed objects in supported MIBs 267 to retrieve the requested data, and returning an SNMP response to NMS 200. In addition, SNMP agent 270 may monitor the status of managed device 250 and maintain operational details of managed device 250 in connection with MIB object identifiers described by supported MIBs 267.

Figure 3:
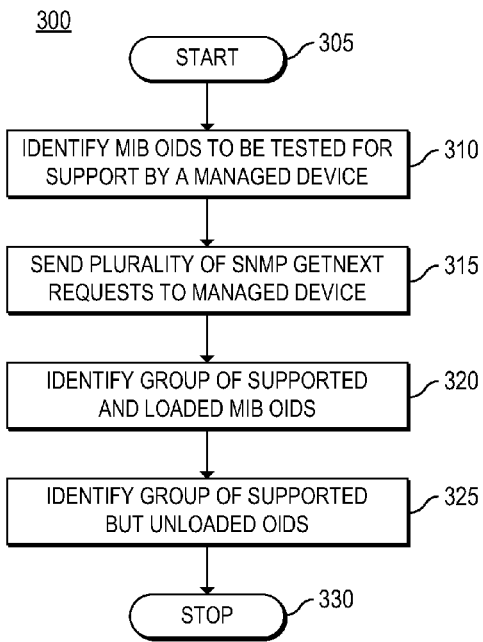
FIG. 3 is a flowchart of an example method for identifying MIB object identifiers supported by a managed device.

FIG. 3 is a flowchart of an example method 300 for identifying MIB object identifiers supported by a managed device. Although execution of method 300 is described below with reference to network management system 100, other suitable devices for execution of method 300 will be apparent to those of skill in the art. Method 300 may be implemented in the form of executable instructions stored on a machine-readable storage medium, such as storage medium 120 of NMS 100, or in the form of electronic circuitry.

Method 300 may start in block 305 and proceed to block 310, where NMS 100 may identify a subset of Management Information Base object identifiers to be tested for support by a managed device. In some embodiments, the group of MIB OIDs to be tested may include or be limited to MIB tables and MIB root object identifiers loaded in NMS 100. For example, NMS 100 may traverse a set of loaded MIBs 117 to identify all MIB root OIDs and at least a subset of the OIDs for tables included in the MIBs.

After NMS 100 identifies the MIB OIDs to be tested for support, method 300 may proceed to block 315, where NMS 100 may send a plurality of SNMP GetNext requests to the managed device. In selecting the OID to be included in each GetNext request, NMS 100 may use the subset of loaded MIB OIDs identified in block 310 and the response to the previous GetNext request. For example, after the first request (which may include the root OID, 0.0), NMS 100 may determine whether there are any MIB OIDs in the group to be tested that are lexicographically subsequent to the MIB OID returned by the managed device. If so, NMS 100 may identify the lexicographically next MIB OID from the group to be tested and include this OID in the next SNMP GetNext request. NMS 100 may repeat this procedure until exhausting the list of MIB OIDs to be tested or until receiving a response indicating that the managed device has reached the end of its loaded MIBs.

In block 320, NMS 100 may identify a group of zero or more MIB OIDs that are loaded in NMS 100 and also supported by the managed device. For example, upon receipt of each SNMP response from the managed device, NMS 100 may identify the MIB OID included in the response and determine whether at least one MIB OID in the subset to be tested is a prefix of the returned MIB OID. If so, NMS 100 may add the longest prefix to the group of MIB OIDs that are loaded in NMS 100 and also supported by the managed device.

Finally, in block 325, NMS 100 may identify a group of zero or more MIB OIDs that are supported by the managed device, but not loaded in NMS 100. For example, when the MIB OID included in the response does not include a prefix in the subset of MIB OIDs to be tested, NMS 100 may add the MIB OID from the response to the group of MIB OIDs that are supported by the managed device, but not loaded in NMS 100. Method 300 may then proceed to block 330, where method 300 may stop.

Figure 4A:
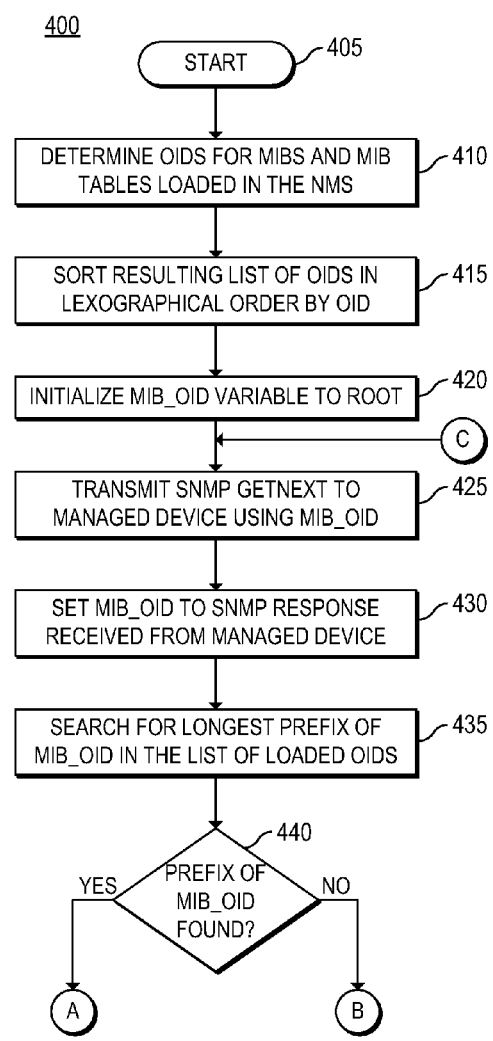
FIGS. 4A-4C are flowcharts of an example method for identifying MIB object identifiers supported by a managed device using a list of object identifiers loaded in a network management system and a set of common extension points.
Figure 4B:
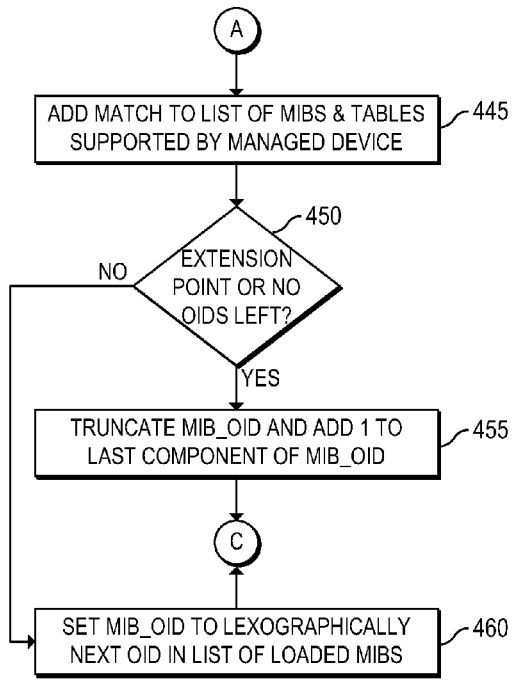
Figure 4C:
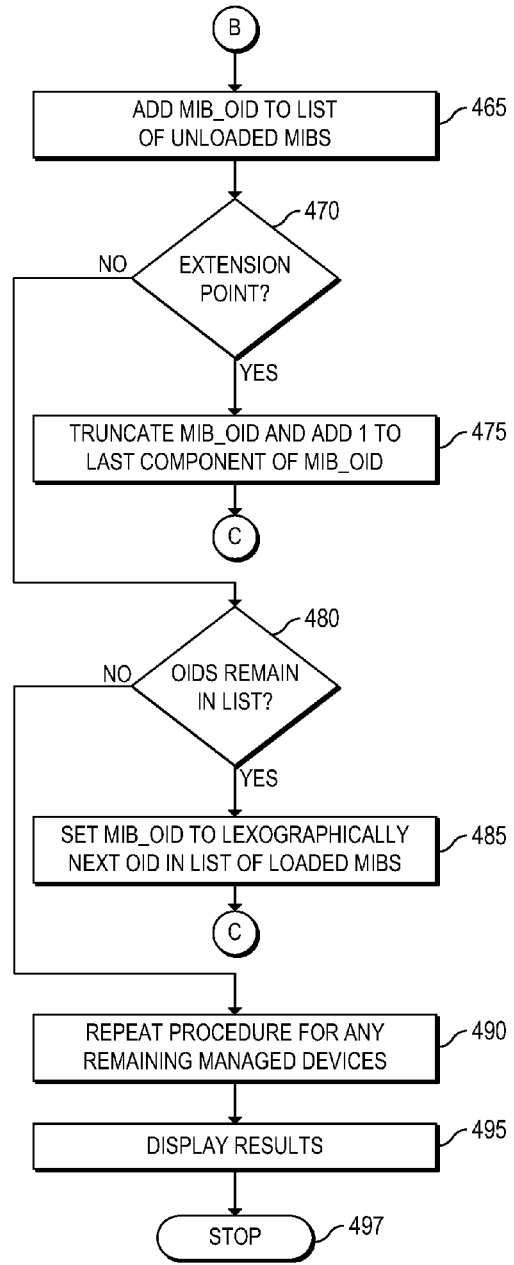

FIGS. 4A-4C are flowcharts of an example method 400 for identifying MIB object identifiers supported by a managed device 250 using a list 217 of object identifiers loaded in a network management system 200 and a set of common extension points 219. Although execution of method 400 is described below with reference to network management system 200, other suitable devices for execution of method 400 will be apparent to those of skill in the art. Method 400 may be implemented in the form of executable instructions stored on a machine-readable storage medium, such as a storage medium 220 of NMS 200, or in the form of electronic circuitry.

Referring initially to FIG. 4A, method 400 may start in block 405 and proceed to block 410, where NMS 200 may identify a list of MIB OIDs to be tested for support by managed device 250. NMS 200 may, for example, determine the object identifiers of one or more MIBs and one or more corresponding MIB tables loaded in NMS 200. In some embodiments, the list of MIB OIDs to be tested may include or be limited to all MIB root OIDs and an OID for each table included in each MIB.

Method 400 may then proceed to block 415, where NMS 200 may sort the list of OIDs generated in block 410 in lexicographical order by OID. By sorting the list of OIDs in lexicographical order, NMS 200 may quickly identify the lexicographically next OID in blocks 460 and 485 based on traversal of the sorted list.

Next, method 400 may proceed to block 420, where NMS 200 may initialize mib_oid, a variable to be used throughout method 400, to the MIB root (i.e., 0.0). Method 400 may then proceed to block 425, where NMS 200 may generate an SNMP GetNext request including mib_oid as the OID parameter. After generating the GetNext request, NMS 200 may transmit the GetNext request to managed device 250.

After transmission of the SNMP GetNext by NMS 200, method 400 may proceed to block 430, where NMS 200 may receive an SNMP response from managed device 250. In accordance with the SNMP protocol, the response to a GetNext request may be a lexicographically next OID supported by managed device 250. This OID may be determined by SNMP agent 270 with reference to the value of mib_oid transmitted with the GetNext request and the MIBs supported 267 by managed device 250. Upon receipt of this response from managed device 250, NMS 200 may set mib_oid to the OID included in the response.

After receipt of the SNMP response, method 400 may proceed to block 435, where NMS 200 may search for a longest prefix of mib_oid in the list of loaded MIBs determined in block 410. NMS 200 may, for example, traverse the sorted list of MIBs to be tested and, upon encountering a matching prefix, determine whether the prefix is a new longest match. If so, NMS 200 may save the MIB OID as the new best match. NMS 200 may repeat this procedure until identifying a longest match from the sorted list of MIBs to be tested, if such a match exists.

Method 400 may then proceed to block 440, where NMS 200 may determine whether a prefix of mib_oid was located in block 435. When it is determined that a prefix of mib_oid is present in the list of loaded MIBs to be tested, method 400 may proceed to block 445 of FIG. 4B, described in detail below. Alternatively, when it is determined that a prefix of mib_oid is not present in the list of loaded MIBs to be tested, method 400 may proceed to block 465 of FIG. 4C, also described in detail below.

Referring now to FIG. 4B, in block 445, NMS 200 may add the longest matching MIB OID from the loaded MIBs to be tested to a list of MIB OIDs that are loaded in NMS 200 and supported by the managed device 250. Method 400 may then proceed to block 450, where NMS 200 may determine whether mib_oid has a prefix that corresponds to a predetermined extension point 219. In addition, NMS 200 may determine whether there are additional MIB OIDs remaining in the list of MIB OIDs to be tested that are lexicographically subsequent to mib_oid.

When mib_oid has a prefix that corresponds to an extension point 219 or when there are no remaining MIB OIDs in the list to be tested, method 400 may proceed to block 455. In block 255, NMS 200 may truncate mib_oid and add one to the last component of mib_oid. For example, when mib_oid has a prefix that corresponds to an extension point 219, NMS 200 may truncate mib_oid down to the direct child branch of the extension point 219 and add one to the child branch's value. For example, if mib_oid is 1.3.6.1.4.1.4.7.10 and 1.3.6.1.4.1 is an extension point, the new value of mib_oid would be 1.3.6.1.4.1.5. Alternatively, when block 455 is reached because there are no remaining OIDs in the list to be tested, NMS 200 may truncate only the last component of mib_oid and add one to the last component. For example, if mib_oid is 1.3.5.6.9 and the list of MIBs to be tested is exhausted, the new value of mib_oid would be 1.3.5.7. After NMS 200 appropriately truncates mib_oid, method 400 may return to block 425 of FIG. 4A for transmission of an additional SNMP GetNext including mib_oid.

Alternatively, if it is determined in block 450 that the current value of mib_oid does not include a prefix that is an extension point 219 and there are remaining MIB OIDs to be tested, method 400 may proceed to block 460. In block 460, NMS 200 may set mib_oid to the OID from the list of OIDs to be tested that is lexicographically subsequent to mib_oid. For example, suppose the list of OIDs to be tested includes 1.3.6.1.2.1.1, 1.3.6.1.2.5, and 1.3.6.1.2.20 and mib_oid is 1.3.6.1.2.3.10. In this case, the new value of mib_oid would be 1.3.6.1.2.5. After NMS 200 sets mib_oid to the lexicographically next MIB OID, method 400 may return to block 425 of FIG. 4A for transmission of an additional SNMP GetNext including mib_oid.

Referring again to block 440 of FIG. 4A, when NMS 200 determines that a prefix of mib_oid is not present in the list of MIB OIDs to be tested, method 400 may proceed to block 465 of FIG. 4C. In block 465, NMS 200 may add mib_oid to a list of MIB OIDs that are supported by managed device 250, but not loaded in NMS 200. Method 400 may then proceed to block 470, where NMS 200 may determine whether mib_oid has a prefix that corresponds to a predetermined extension point 219.

If NMS 200 determines that mib_oid has a prefix that is a predetermined extension point 219, method 400 may proceed to block 475, where NMS 200 may truncate mib_oid down to the direct child branch of the extension point 219 and add one to the child branch's value. Method 400 may then return to block 425 of FIG. 4A for transmission of an SNMP GetNext request including mib_oid as a parameter.

When it is instead determined in block 470 that mib_oid does not have a prefix that corresponds to a predetermined extension point 219, method 400 may proceed to block 480. In block 480, NMS 200 may determine whether any MIB OIDs remain in the list of MIB OIDs to be tested that are lexicographically subsequent to mib_oid. If so, method 400 may proceed to block 485, where NMS 200 may set mib_oid to the lexicographically next OID from the list of OIDs to be tested. Method 400 may then return to block 425 of FIG. 4A for transmission of an SNMP GetNext request including mib_oid as a parameter.

Alternatively, when it is determined in block 480 that there are no remaining MIB OIDs to be tested that are lexicographically subsequent to mib_oid, NMS 200 may determine that testing is completed for managed device 250. Accordingly, method 400 may proceed to block 490, where NMS 200 may repeat the testing procedure for any remaining managed devices to be tested. More specifically, NMS 200 may return to block 420 and repeat the procedure for the next managed device to be tested. In some embodiments, NMS 200 may add any identified MIB OIDs to the same results list for each managed device, such that the resulting list may provide a network operator with a view of all important MIBs that are supported within the network. Alternatively, NMS 200 may generate a separate listing for each managed device, such that the operator may separately determine MIBs that are supported by each managed device.

After completion of testing for all managed devices, method 400 may proceed to block 495, where NMS 200 may output the results 230. The displayed results 330 may include, for example, a list of loaded MIBs 217 that are supported by managed device 250 and a list of MIBs supported by managed device 250 that are not loaded in NMS 200. An example of results that may be displayed is provided below in connection with results 520 of FIG. 5. After output of the results, method 400 may proceed to block 497, where method 400 may stop.

Figure 5:
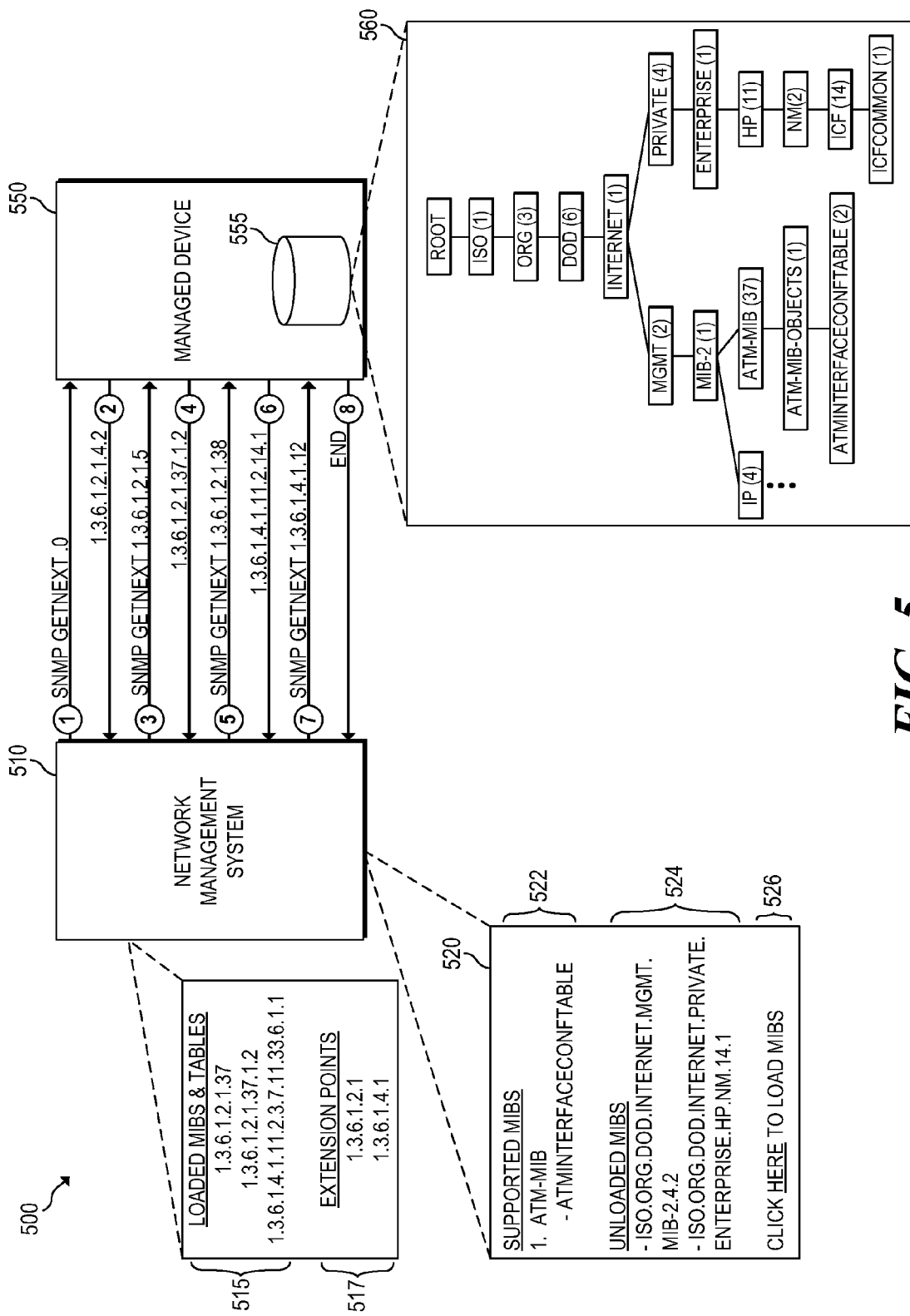
FIG. 5 is a block diagram of an example operation flow between a network management system and a managed device for determining MIB object identifiers supported by the managed device.

FIG. 5 is a block diagram of an example operation flow 500 between a network management system 510 and a managed device 550 for determining MIB object identifiers supported by the managed device 550. As illustrated, a network management system 510 is in communication with a managed device 550 to exchange SNMP requests and responses. NMS 510 includes a number of OIDs to be tested 515 for support by managed device 550 and, in addition, includes a number of predefined extension points 517. Managed device 550 includes a storage device 555 that stores a Management Information Base 560 including a hierarchy of MIB OIDs.

Operational flow 500 may start in sequence item 1, where NMS 510 may generate and transmit an initial SNMP GetNext request including the MIB root, .0. In sequence item 2, managed device 550 may access MIB 560 to identify the MIB OID of the lexicographically next managed object, which, in this case, is 1.3.6.1.2.1.4.2, an object included in the IP MIB. Managed device 550 may then return this MIB OID in an SNMP response.

In sequence item 3, NMS 510 may receive the returned MIB OID and initially determine whether any of the MIB OIDs to be tested 515 is a prefix of the returned MIB OID. Because 1.3.6.1.2.1.4.2 does not have a prefix in MIB OIDs 515, NMS 510 may add the MIB OID to results 520 and, more specifically, to a list of unloaded MIBs 524. Thus, as illustrated, NMS 510 may add the text object identifier of the returned MIB up to a point to which NMS 510 has knowledge based on its loaded MIBs. Accordingly, NMS 510 may add iso.org.dod.internet.mgmt.mib-2.4.2 to the list of unloaded MIBs 524.

NMS 510 may then determine whether the returned MIB OID includes a prefix that is an extension point 517. NMS 510 may thereby determine that the returned MIB OID includes an extension point prefix, 1.3.6.1.2.1. Accordingly, NMS 510 may truncate the MIB OID down to the direct child of the extension point (1.3.6.1.2.1.4) and add one to the last element to obtain 1.3.6.1.2.1.5. NMS 510 may then transmit an SNMP GetNext request including 1.3.6.1.2.1.5.

In sequence item 4, managed device 550 may receive the request and access MIB 560 to identify the MIB OID of the lexicographically next managed object, which is 1.3.6.1.2.1.37.1.2. This MIB OID corresponds to the ATMInterfaceConfTable object included in ATM-MIB. Managed device 550 may then return this OID to NMS 510 in an SNMP response.

In sequence item 5, NMS 510 may receive the response and determine that the returned OID is an exact match of an OID included in the OIDs to be tested 515. Accordingly, NMS 510 may add 1.3.6.2.1.37.1.2 (ATMInterfaceConfTable) to the list of supported MIBs 522. In some embodiments, NMS 510 may also add the name of the parent MIB to the list of supported MIBs 522, which is ATM-MIB in this case. NMS 510 may then determine that the returned MIB OID includes a prefix that is an extension point (1.3.6.1.2.1) and therefore generate and transmit an SNMP GetNext including 1.3.6.2.1.38.

In sequence item 6, managed device 550 may receive the request and, in response, retrieve the lexicographically next managed object, 1.3.6.1.4.1.11.2.14.1. Managed device 550 may then generate and transmit an SNMP response including this MIB OID.

In sequence item 7, NMS 510 may receive the response and determine that the MIB OID included in the response does not include a prefix in the set of MIBs to be tested 515. Accordingly, NMS 510 may add the MIB OID to the list of unloaded MIBs 524, including the text identifier up to a point at which NMS 510 has knowledge. Accordingly, NMS 510 may add iso.org.dod.internet.private.enterprise.hp.nm.14.1 to the list of unloaded MIBs 524.

In addition, NMS 510 may determine that the returned MIB includes a prefix that is an extension point, 1.3.6.1.4.1. Accordingly, NMS 510 may truncate the returned MIB down to the direct child of the extension point (1.3.6.1.4.1.11) and add one to the last component, resulting in 1.3.6.1.4.1.12. NMS 510 may then transmit an SNMP GetNext including this OID. In sequence item 8, managed device 550 may determine that it has reached the end of its loaded MIBs and therefore return a value indicating that it does not have any additional object identifiers to return.

In response, NMS 510 may compile the results 520 and display the results 520 to a user of NMS 510. Results 520 may include, for example, supported MIBs 522, unloaded MIBs 524, and a selectable element 526 for initiating a MIB loading procedure.

According to the foregoing, example embodiments disclosed herein relate to identification of MIB OIDs supported by a managed device by using a subset of MIBs to be tested for support and selecting an OID to be included in each request based on a response to a previous request. In this manner, example embodiments disclosed herein allow for efficient discovery of a set of MIBs that are supported by a managed device in a manner that reduces the time required for the process, while also reducing generated network traffic.

I claim:

1. A network management system comprising:
a storage device maintaining a database of MIBs loaded on the network management system; and
a processor to:
identify a subset of MIB object identifiers (OIDs) of interest from the MIBs loaded on the network management system to be tested for support by a managed device,
transmit a series of requests to the managed device, the transmitting comprising:
(1) transmitting an initial request to test the managed device for an initial OID of interest from the subset of OIDs of interest,
(2) receiving a response to the initial request including an initial returned MIB OID,
(3) determining that there are remaining MIB OIDs in the subset of interest that are lexicographically subsequent to the returned MIB OID, and
(4) for each remaining MIB OID, transmitting a subsequent request including a MIB OID from the subset of MIB OIDs of interest that is lexicographically next with respect to a previous returned MIB OID included in a previous response;
identify, based on each response to each request from the managed device:
a first group of MIB OIDs in the subset of MIB OIDs of interest that are supported by the managed device, and
a second group of MIB OIDs that are supported by the managed device, but are not loaded on the network management system; and
enable the network management system to manage the managed device based on at least the identified first group of MIB OIDs.

2. The network management system of claim 1, wherein, to identify the subset of MIB OIDs of interest, the processor identifies:
a MIB root OID for each MIB loaded on the network management system, and
a MIB OID for each MIB table in each MIB.

3. The network management system of claim 1, wherein the initial request comprises a MIB root.

4. The network management system of claim 1, the transmitting further comprising:
(5) stopping transmission of requests when there are no remaining MIB OIDs in the subset of interest or when the previous response from the managed device indicates that there are no remaining MIB OIDs on the managed device.

5. The network management system of claim 1, wherein:
the determining further comprises determining that the returned MIB OID includes a prefix that is a predetermined extension point of interest; and
transmitting the subsequent request comprises:
(a) generating and transmitting the subsequent request including a lexicographically next child from the predetermined extension point when the previous returned MIB OID includes a prefix that is the predetermined extension point, and
(b) generating and transmitting the subsequent request including the lexicographically next MIB OID from the subset of MIB OIDs of interest when the previous returned MIB OID does not include a prefix that is the predetermined extension point and there are remaining MIB OIDs.

6. The network management system of claim 1, wherein, to identify the first group of MIB OIDs that are supported by the managed device, the processor:
 identifies the returned MIB OID included in the previous response from the managed device,
 determines whether at least one prefix of the returned MIB OID is present in the subset of MIB OIDs of interest, and
 adds a longest prefix to the first group of MIB OIDs that are supported by the managed device when at least one prefix of the returned MIB OID is present.

7. The network management system of claim 6, wherein the processor:
 adds the previous returned MIB OID from the previous response to the second group of MIB OIDs that are supported by the managed device but not loaded on the network management system when no prefixes of the previous returned MIB OID are present in the subset of MIB OIDs of interest.

8. A non-transitory machine-readable storage medium encoded with instructions executable by a processor of a network management system to perform a method, the method, comprising:
 identifying, by the network management system, a subset of loaded MIB object identifiers (OIDs) of interest from MIBs loaded on the network management system to be tested for support by the managed device,
 transmitting, from the network management system, a series of requests to the managed device, the transmitting comprising:
  (1) transmitting an initial request to test the managed device for an initial OID of interest from the subset of OIDs of interest,
  (2) receiving a response to the initial request including an initial returned MIB OID
  (3) determining that there are remaining MIB OIDs in the subset of interest that are lexicographically subsequent to the returned MIB OID, and
  (4) for each remaining MIB OID, transmitting a subsequent request including a MIB OID from the subset of MIB OIDs of interest that is lexicographically next with respect to a previous returned MIB OID included in a previous response;
 identifying, based on each response to each request from the managed device:
  a first group of MIB OIDs in the subset of MIB OIDs of interest that are supported by the managed device, and
  a second group of MIB OIDs that are supported by the managed device, but are not loaded on the network management system; and
 enabling the network management system to manage the managed device based on at least the identified first group of MIB OIDs.

9. The non-transitory machine-readable storage medium of claim 8, the method further comprising:
 displaying results identifying each MIB OID in the first group of MIBs and each MIB OID in the second group of MIBs.

10. The non-transitory machine-readable storage medium of claim 9, wherein displaying the results further comprises displaying a selectable element for initiating a process to load a MIB from the second group of MIBs.

11. A method enabling a network management system to identify functions supported by a managed device, the method comprising:
 identifying, by the network management system, a subset of loaded MIB object identifiers (OIDs) of interest from MIBs loaded on the network management system to be tested for support by the managed device;
 transmitting, from the network management system, a series of requests to the managed device, the transmitting comprising:
  (1) transmitting an initial request to test the managed device for an initial OID of interest from the subset of OIDs of interest,
  (2) receiving a response to the initial request including an initial returned MIB OID
  (3) determining that there are remaining MIB OIDs in the subset of interest that are lexicographically subsequent to the returned MIB OID, and
  (4) for each remaining MIB OID, transmitting a subsequent request including a MIB OID from the subset of MIB OIDs of interest that is lexicographically next with respect to a previous returned MIB OID included in a previous response;
 identifying, based on each response to each request from the managed device:
  a first group of MIB OIDs in the subset of MIB OIDs of interest that are supported by the managed device, and
  a second group of MIB OIDs that are supported by the managed device, but are not loaded on the network management system; and
 enabling the network management system to manage the managed device based on at least the identified first group of MIB OIDs.

12. The method of claim 11, further comprising:
 sorting the identified subset of loaded MIB OIDs in lexicographical order for use in selecting the OID included with each request.

13. The method of claim 11, wherein:
 the determining further comprises determining that the returned MIB OID includes a prefix that is a predetermined extension point; and
 transmitting the subsequent request comprises:
  (a) transmitting a next request including a lexicographically next branch from the predetermined extension point when the previous returned MIB OID includes a prefix that is the predetermined extension point; and
  (b) transmitting a next request including the lexicographically next MIB from the subset of loaded MIB OIDs when the previous returned MIB OID does not include a prefix that is the predetermined extension point and there are remaining MIB OIDs in the subset of loaded MIB OIDs to be tested that are lexicographically subsequent to the returned MIB OID.

14. The method of claim 11, wherein identifying the first group of MIB OIDs and the second group of MIB OIDs comprises, for each response:
 determining whether the returned MIB OID includes a matching prefix in the subset of loaded MIB OIDs to be tested;
 adding a longest matching MIB OID from the subset of loaded MIB OIDs to the first group of MIB OIDs when the returned MIB OID includes a matching prefix in the subset of loaded MIB OIDs; and
 adding the returned MIB OID to the second group of MIB OIDs when the returned MIB OID does not include a matching prefix in the subset of loaded MIB OIDs.

* * * * *

UNITED STATES PATENT AND TRADEMARK OFFICE
CERTIFICATE OF CORRECTION

PATENT NO. : 8,312,128 B2
APPLICATION NO. : 12/847812
DATED : November 13, 2012
INVENTOR(S) : Jeff Conrad Page 1 of 1

It is certified that error appears in the above-identified patent and that said Letters Patent is hereby corrected as shown below:

In column 13, line 23, in Claim 8, delete "method," and insert -- method --, therefor.

In column 13, line 35, in Claim 8, delete "OID" and insert -- OID, --, therefor.

In column 14, line 12, in Claim 11, delete "OID" and insert -- OID, --, therefor.

Signed and Sealed this
Twenty-sixth Day of March, 2013

Teresa Stanek Rea
*Acting Director of the United States Patent and Trademark Office*